(12) United States Patent
Lauret

(10) Patent No.: US 10,101,591 B2
(45) Date of Patent: Oct. 16, 2018

(54) OPTICAL COLLIMATOR

(71) Applicant: GAGGIONE SAS, Montréal-la-Cluse (FR)

(72) Inventor: Jean-Pierre Lauret, Oyonnax (FR)

(73) Assignee: GAGGIONE SAS, Montréal-la-Cluse (FR)

( * ) Notice: Subject to any disclaimer, the term of this patent is extended or adjusted under 35 U.S.C. 154(b) by 0 days.

(21) Appl. No.: 15/300,100

(22) PCT Filed: Mar. 18, 2015

(86) PCT No.: PCT/FR2015/050655
§ 371 (c)(1),
(2) Date: Sep. 28, 2016

(87) PCT Pub. No.: WO2015/145026
PCT Pub. Date: Oct. 1, 2015

(65) Prior Publication Data
US 2017/0139223 A1   May 18, 2017

(30) Foreign Application Priority Data
Mar. 28, 2014   (FR) ..................... 14 52747

(51) Int. Cl.
*G02B 27/30* (2006.01)
*G02B 19/00* (2006.01)
(Continued)

(52) U.S. Cl.
CPC .............. *G02B 27/30* (2013.01); *F21V 13/04* (2013.01); *G02B 1/041* (2013.01); *G02B 17/086* (2013.01);
(Continued)

(58) Field of Classification Search
CPC . G02B 19/0028; G02B 27/30; G02B 27/0944
(Continued)

(56) References Cited

U.S. PATENT DOCUMENTS

| 7,407,316 B2* | 8/2008 | Noh ....................... G02B 6/003 |
| | | 362/23.18 |
| 7,712,930 B2* | 5/2010 | Repetto ................... F21V 5/04 |
| | | 362/307 |

(Continued)

OTHER PUBLICATIONS

Jun. 5, 2015 International Search Report issued in International Patent Application No. PCT/FR2015/050655.
(Continued)

*Primary Examiner* — Mahidere Sahle
(74) *Attorney, Agent, or Firm* — Oliff PLC

(57) ABSTRACT

A collimator having an overall bowl shape. The collimator is rotationally symmetrical about an optical axis of the collimator, and has an output wall, an input recess opposite the output wall, the input recess being defined by an internal side wall and an internal upper wall which interrupts the internal side wall in such a way as to define an intersection region, the internal side wall and the internal upper wall being designed to allow an incident light ray to enter the collimator peripherally and centrally, respectively, and a peripheral reflective wall joining the output wall to the internal side wall, the surface of the internal side wall being designed in such a way that a straight line, which is tangential to the internal side wall and joins the intersection region, passes through the focal point of the collimator.

14 Claims, 3 Drawing Sheets

(51) Int. Cl.
*F21V 13/04* (2006.01)
*G02B 1/04* (2006.01)
*G02B 17/08* (2006.01)

(52) U.S. Cl.
CPC ..... *G02B 19/0028* (2013.01); *G02B 19/0061* (2013.01)

(58) Field of Classification Search
USPC ........................................................ 359/641
See application file for complete search history.

(56) References Cited

U.S. PATENT DOCUMENTS

| | | | |
|---|---|---|---|
| 7,942,558 B2* | 5/2011 | Zweig | G02B 6/0018 362/311.06 |
| 2002/0080615 A1 | 6/2002 | Marshall et al. | |
| 2009/0128921 A1* | 5/2009 | Roth | F21V 5/04 359/641 |
| 2009/0268166 A1 | 10/2009 | Chen et al. | |
| 2014/0316742 A1* | 10/2014 | Sun | G02B 19/0066 702/167 |
| 2017/0114226 A1* | 4/2017 | Tasaki | C09D 5/004 |

OTHER PUBLICATIONS

Jun. 5, 2015 Written Opinion issued in International Patent Application No. PCT/FR2015/050655.

\* cited by examiner

OPTICAL COLLIMATOR

The present invention concerns an optical collimator intended for collimating a beam coming from a light source allowing limiting the Fresnel losses.

In the conventional collimators, the incident beams are transmitted by refraction through an input surface. This input surface is an optical surface separating two materials of different refractive index. Hence, a portion of the incident beam is reflected by the input surface of the collimator rather than being transmitted, this constitutes the Fresnel losses by reflection. For the common optical materials, this portion reduces, by approximately 4%, the overall light transmission. This beam portion is then reflected by an outer reflection surface of the collimator then is transmitted by forming a high angle relative to the optical axis by an output surface of the collimator. Thus, this beam portion then forms a peripheral ring of stray light around the main light beam coming from the collimation of the incident light beam. This reduces the quality of the obtained lighting, which is not suitable, in this way, for all the desired applications, in particular applications of the medical field.

A collimator allowing overcoming at least one of these drawbacks is then desirable. To this end, the present invention provides an optical collimator intended for collimating a beam coming from a light source, the collimator having a bowl overall shape, the collimator comprising a rotational symmetry about the optical axis of the collimator, an output wall, an input recess opposite to the output wall, the input recess being defined by an inner lateral wall and an inner upper wall adjacent to the inner lateral wall so as to define an intersection area, the inner lateral wall and the inner upper wall being intended for the input, respectively peripheral and central, of an incident light beam in the collimator, a peripheral reflection wall joining the output wall to the inner lateral wall, the surface of the inner lateral wall being configured so that a straight line D tangential to the inner lateral wall and joining the intersection area passes through the focus of the collimator. Thus, in this configuration, the incident rays which would have been responsible for the formation of a peripheral ring of stray light are reflected on the inner lateral wall at a grazing incidence. Consequently, the reflection of these rays allows refocusing toward the inner upper wall where they are collected as if they came from a beam coming from a point in the vicinity of the focus. The refocused rays are thus added to the main beam which is brighter. Furthermore, the annular ring of stray light is strongly reduced.

It is understood in the present document that the inner lateral wall and the inner upper wall are intended for the input of incident light rays, the peripheral reflection wall is intended for reflecting the rays intercepted by the inner lateral wall and the output wall is intended to emerge the light rays.

Of course, throughout the entire document, the peripheral reflection wall is mutually configured with the inner lateral wall so as to collimate an incident light beam.

Advantageously, the inner lateral wall has a curvilinear surface with rotational symmetric about the optical axis of the collimator.

Preferably, the inner lateral wall comprises a convex portion configured so as to intercept at the same point A, a central ray coming from the focus and a virtual marginal ray extending an effective marginal ray from the periphery of the light source, the effective marginal ray being intercepted at a point B of the inner lateral wall and such that the peripheral reflection wall reflects the central ray at a point A' and the effective marginal ray at a point B' with the point A distinct from the point B and the point A' having a distance relative to the focus greater than that of the point B'.

Thanks to this configuration, the effective marginal ray is earlier intercepted in its path through the inner lateral wall which refracts it to the peripheral reflection wall. It then emerges from the output wall while being collimated, that is to say substantially parallel to the optical axis. The path of the effective marginal ray is then substantially identical to that of a central ray coming from a point near the focus. This configuration of the optical collimator thus allows collimating the light rays sufficiently distant from the focus without the need to extend the inner reflection wall. In the prior art, indeed, it is known to extend the inner reflection wall to intercept light rays coming from points distant from the focus. However, this solution has the effect of taking the design of the collimator away from its ideal conformation and makes it more bulky. Thus, the present invention allows collimating the light sources larger than those which can be collimated by conventionally configured collimators.

Preferably, the inner lateral wall comprises an annular area defined from the focus under a solid angle α (alpha) comprised between 35° and 90° relative to the optical axis, the tangent of the annular area forming an angle β (beta) comprised between 0° and 30° relative to the optical axis. This annular area thus has a relatively low slope allowing this area of the inner lateral wall to meet as closer as possible the light source. This allows lighting a larger area in the vicinity of the output surface of the collimator. According to the conservation law of the geometric extent which says that the light beam is the more intense as its section is large, this configuration thus allows obtaining a more intense light beam.

Advantageously, the collimator is one-piece collimator. Its manufacture does not require the assembly step of several parts, which allows reducing the workforce and thus reducing the costs.

Preferably, the collimator consists of polymer which allows a manufacture by moulding.

Advantageously, the material constituting the one-piece collimator has a shore-A hardness lower than or equal to 90, preferably a shore-A hardness comprised between 50 and 80 and even more preferably a shore-A hardness of about 70.

Preferably, the polymer is selected from a silicone, a polyurethane resin or any other material transparent in the visible range, flexible at room temperature and thermosetting. The flexibility of these materials, defined by the hardness shore-A ranges listed hereinabove, allows an easy demolding of the collimator in particular when it is one-piece collimator despite its design comprising a convex region forming an undercut.

According to a variant, the collimator is composed of several assembled members. Each of these members is advantageously made of a thermoplastic polymer transparent in the visible. Among these polymers, it is selected, for example, polycarbonate, PMMA, cyclo-olefin copolymer, polystyrene and polyamide.

According to one possibility, the inner upper wall comprises a portion having a convex surface. This conformation is conventionally calculated so as to transmit a majority of incident rays towards the output wall by forming a collimated beam.

According to yet another possibility, the output wall comprises a portion having a substantially flat surface. It is thus possible to focus the light at infinity.

Alternatively, the output wall comprises a portion having a substantially concave surface. This variant is in particular advantageous on the collimators with significant dimensions since it allows a substantial material gain.

According to another variant, the output wall comprises a portion having a substantially convex surface, so as to converge the light rays coming from the focus. Thus, this configuration makes it possible to focus the near-field light.

According to yet another variant, the output wall is divided into a central area and a peripheral area, the surface of the central area being configured to share the refraction of the incident light beam with the inner upper wall so as to obtain a collimated beam and the surface of the peripheral area being configured to operate in association with the peripheral reflection wall. These configurations allow adding degrees of freedom to the optical design of the collimator. This configuration of the surface of the central area allows more finely optimizing the light intensity distribution. The configuration of the surface of the peripheral area can also be concave, convex or textured, for example in order to improve its ability to converge, diverge the light rays, etc.

Advantageously, the central area has a circle-shaped periphery and the peripheral area has an annular shape delimiting the periphery of the central area.

According to one possibility, the output wall has a surface comprising a micro-texturing configured to generate one type of light beam from the light source such as an intermediate beam, a wide beam or an elliptical beam. It is thus possible to obtain different distributions of light intensity from a narrow beam which is the base beam without micro-texturing. The base narrow beam will be for example 10° FWHM (English acronym of full width maximum half), the intermediate beam allowing reaching about 25° FWHM, the wide beam reaching about 40° FWHM and the elliptical beam allowing reaching about 10°×40° FWHM.

Other aspects, objects and advantages of the invention will appear better on reading the following description of different embodiments thereof, given by way of non-limiting examples and made with reference to the appended drawings. The figures do not necessarily match the scale of all shown members in order to improve their readability. In the following description, for the sake of simplification, the identical, similar or equivalent elements of different embodiments have the same numerical references.

Figure 1:
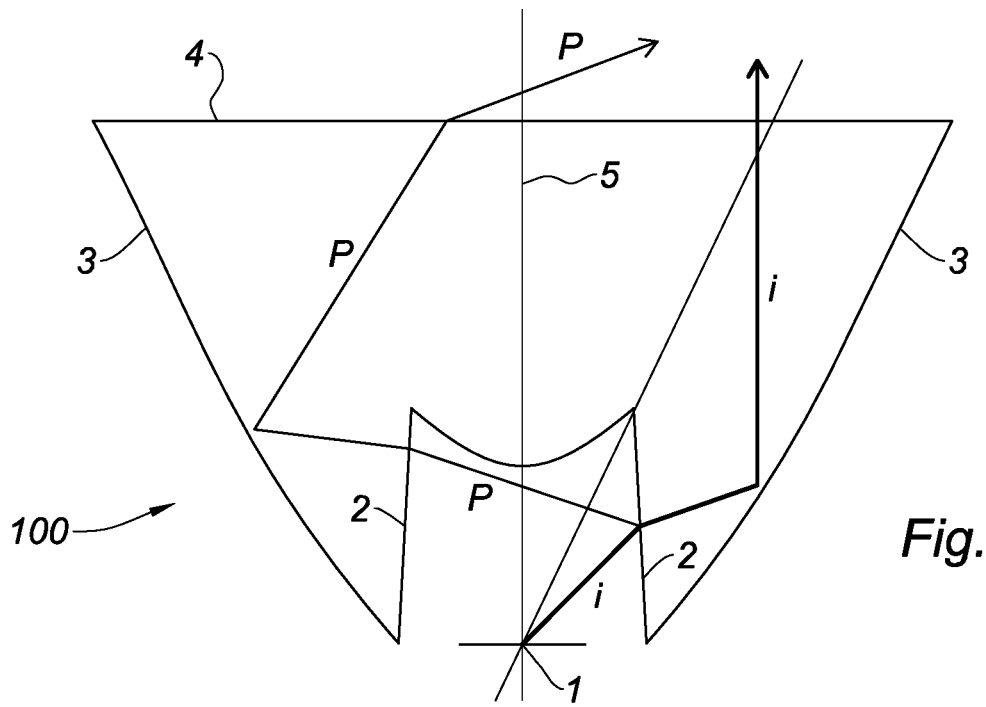
FIGS. 1 and 2 show a known «flat top tulip» type conventional collimator.

FIG. 1 illustrates the path of an incident beam in a conventional optical collimator 100. A portion of the beam starting from the focus 1 of the collimator 100 is firstly refracted on an input inner lateral wall 2 forming a main beam i which is then reflected on a peripheral reflection wall 3 to emerge from an output wall 4 substantially parallel to the optical axis 5 of the collimator 100. The other portion of the incident beam is reflected by the lateral input wall 2 according to the Fresnel reflection. This produces a beam p of stray light which emerges from the output wall 4 with a high angle relative to the optical axis 5. This reflection or Fresnel loss contributes to reduce the overall light efficiency to about 4%. The beam p is also the source of a light ring of stray light around the collimated main beam i (not illustrated).

Figure 2:
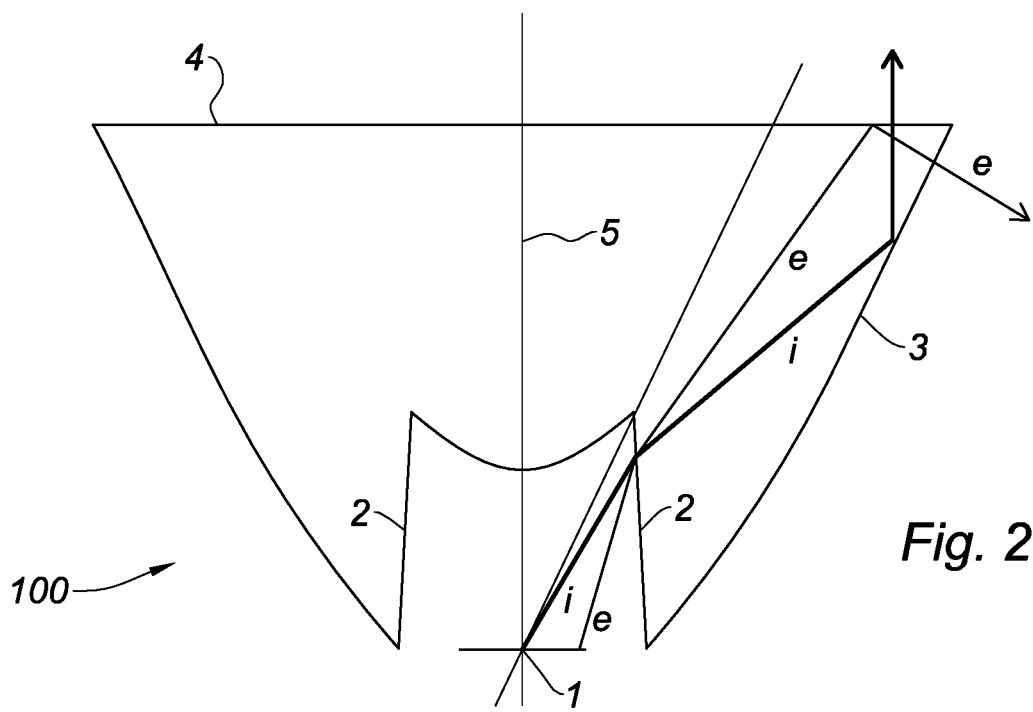

FIG. 2 illustrates the path of an incident beam e coming from the periphery of a light source, it is then distant from the focus 1 of the conventional collimator 100. This path is compared to the course of a beam i coming from the focus 1 which emerges from the output wall 4 by following an axis parallel to the optical axis 5 and which is perfectly collimated. As illustrated in FIG. 2, the distant beam e is not effectively collected. The distant beam e passes through the inner lateral wall 2 and the output wall 4 without being focused on the peripheral reflection wall 3 as the latter does not have a sufficiently large size to be able to intercept it. Indeed, if the peripheral reflection wall 3 was extended, it would intercept the distant beam e before the latter reaches the output wall 4. Consequently, as shown in FIG. 2, the beam e emerges from the collimator 100 by being reflected by the output wall 4 and by forming a high angle with the optical axis 5, on the contrary of the beam i coming from the focus 1 which is intercepted by the peripheral reflection wall 3 with an angle allowing a transmission by the output wall 4. The beam e coming from the edge of the source then results in, depending on the architecture of the collimator 100, a loss of light intensity or formation of stray light.

Figure 3:
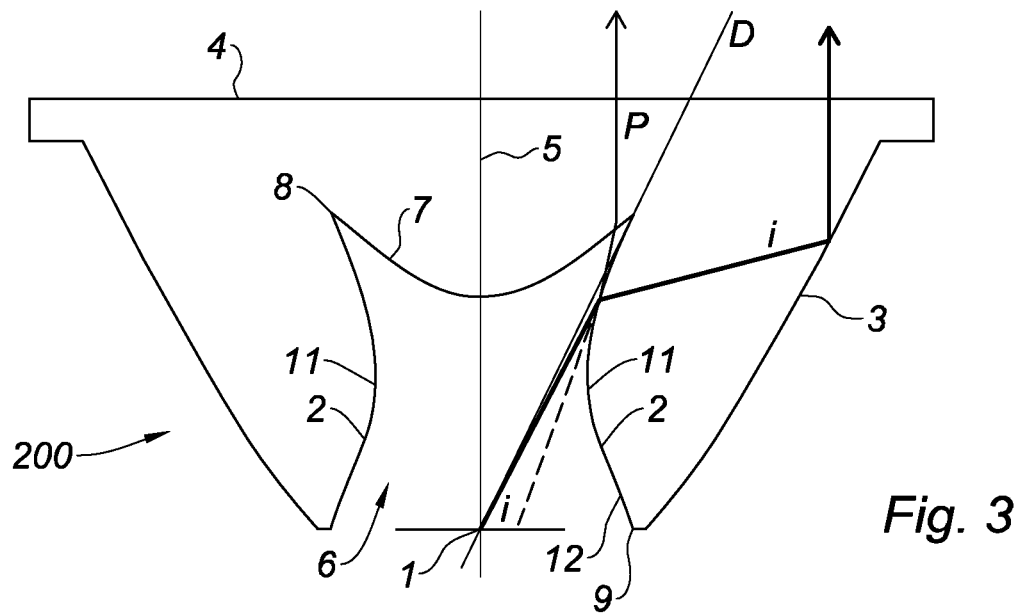
FIGS. 3 and 4 show a collimator according to a first embodiment of the invention.

FIG. 3 is a collimator 200 according to a first embodiment of the invention. This collimator 200 comprises a bowl overall shape with a rotational symmetry about its optical axis 5. The collimator 200 comprises an output wall 4, an input recess 6 opposite to the output wall 4 and a peripheral reflection wall 3 joining the output wall 4 to the input recess 6. The output wall 4 allows the transmission of substantially collimated rays out of the collimator 200. This output wall is flat 4 but according to non-illustrated variants, the output wall 4 comprises a portion whose surface is convex or concave. According to yet another possibility, the surface of the output wall 4 comprises a micro-texturing.

The input recess 6 of the collimator 200 is intended for the input of the incident beams coming from the light source. It is composed of an inner lateral wall 2, whose surface is curvilinear while keeping the rotational symmetry about the optical axis 5, and of an inner upper wall 7 comprising a convex surface portion. The focus 1 of the collimator 200 is located at the peripheral edge of the recess 6, opposite to the inner upper wall 7. The inner upper wall 7 intersects the inner lateral wall 2 by defining a circle-shaped intersection area 8. As illustrated in FIG. 3, the surface of the inner lateral wall 2 is configured such that a straight line D passing through the focus 1 of the collimator 200 and the intersection 8 between the inner upper wall 7 and the inner lateral wall 2 is tangential to the inner lateral wall 2. For this purpose, the surface of the inner lateral wall 2 and the surface of the peripheral reflection wall 3 can be calculated according to two distinct ways.

According to one first possibility, the inner lateral wall 2 is calculated to present a predefined geometry with rotational symmetry about the optical axis 5, for example a circular arc or continuous curvilinear shape. Then the surface of the inner lateral wall 2 is calculated so as to present a tangent at the point of intersection 8 with the inner upper wall 7 passing through the focus 1. The other parameters of the inner lateral wall 2 are arbitrarily defined.

Then, a light ray bundle starting from the focus 1 and intercepting the inner lateral wall 2 are considered according to the law of refraction $n1 \times \sin(i1) = n2 \times \sin(i2)$. These light rays transmitted by the inner lateral wall 2 will intercept the peripheral reflection wall 3. The surface of the latter is then calculated using a photometric optimization software, such as LightTools, so that the light rays once reflected are parallel to the optical axis 5.

According to one second possibility, the surfaces of the inner lateral wall 2 and the peripheral reflection wall 3 are simultaneously calculated by setting a target that:

A light beam bundle coming from the focus 1 comes out from the collimator 200 by being parallel to the optical axis 5 «far-field optimization»

A light beam bundle coming from the focus 1 comes out from the collimator 200 by being regularly ordered along the output wall 4 «near-field optimization».

This construction technique allows a free choice on two parameters: the tangent of the inner lateral wall 2 at the top, that is to say at the intersection 8 with the inner upper wall, and the tangent of the inner lateral wall 2 with the base, that is to say at the intersection 9 with the peripheral reflection wall 3.

It is then possible with this technique to set that the tangent at the top passes through the focus 1 of the collimator 200.

The construction of the tangent of the inner lateral wall 2 at the top also defines the starting point of the surface of the inner upper wall 7. The convex surface of the inner upper wall 7 is also conventionally configured, so as to transmit all the rays coming from the focus 1 to a collimated beam.

Furthermore, according to a non-illustrated possibility, the output wall 4 is divided into a central area whose periphery has the shape of a circle and a peripheral area surrounding the central area. In this case, the central area is configured to operate in association with the inner upper wall 7 and the peripheral area is configured to operate in association with the inner lateral wall 2. This configuration is, in particular, obtained by generalizing the calculation principles evoked hereinabove by including these areas.

The collimator 200 thus configured allows avoiding the Fresnel losses. The rays p which would have led to the formation of the stray light ring in a conventional configuration are reflected on the inner lateral wall 2 with an angle of grazing incidence so that the rays p are directed towards the inner upper wall 7 where they are collected as if they came directly from a point near the focus 1, as illustrated by the dotted lines defining a virtual ray. These reflected rays p are then added to the main beam so as the latter gains in light intensity while limiting the formation of a ring of stray light.

Figure 4:
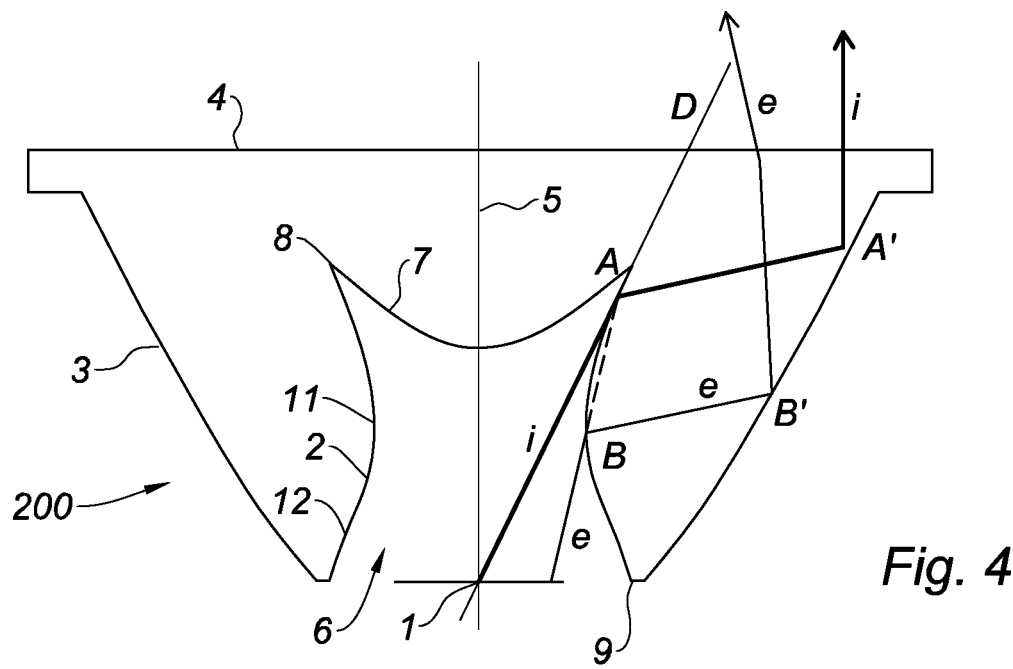

FIG. 4 illustrates the path of a light beam e coming from the periphery of the light source and that of a light ray i coming from the focus 1. This ray l coming from the focus 1 is transmitted to the point A of a convex portion 11 of the inner lateral wall 2, is reflected to the point A' of the peripheral reflection wall 3 to emerge from the output wall 4 substantially coaxially with the optical axis 5.

The ray e coming from the periphery of the source is transmitted to the point B on the convex portion 11 of the inner lateral wall 2. The extension of this ray e forms a virtual ray passing through A. Then this beam e is collected on the peripheral reflection wall 3 at the point B' to be returned to the output wall 4 so as to emerge by forming a small angle with the optical axis 5. The ray e is then added to the collimated beam, on the contrary of a ray e coming from the same point distant from the focus 1 in a conventional collimator 100 as illustrated in FIG. 2.

Thus, the configuration of the convex portion 11 makes it possible to intercept much more the incident rays e distant from the focus 1 due to its lower position as compared to a straight lateral wall. The ray e is redirected to the peripheral reflection wall 3 instead of forming stray lights (FIG. 2) or leading to losses.

The surface of this convex portion 11 is determined by considering a central ray coming from the focus 1 and refracted on the inner lateral wall 2 at any point of interception A and a marginal ray distant from the focus 1 also passing virtually through the same point A. The extension of the marginal beam, called virtual ray, is illustrated in dashed line. Physically, the marginal ray intercepts the surface of the convex portion 11 at a point B distinct from the point A. A point A' defines the reflection point on the peripheral reflection wall 3 of the central ray and a point B' defines the reflection point on the peripheral reflection wall 3 of the marginal ray. The surface of the inner lateral wall 2 and that of the peripheral reflection wall 3 are then subsequently calculated using any of the methods explained hereinabove taking into account two additional constraints: the points A and B must be distinct and A' must be farther from the focus 1 than is B'.

Figure 5:
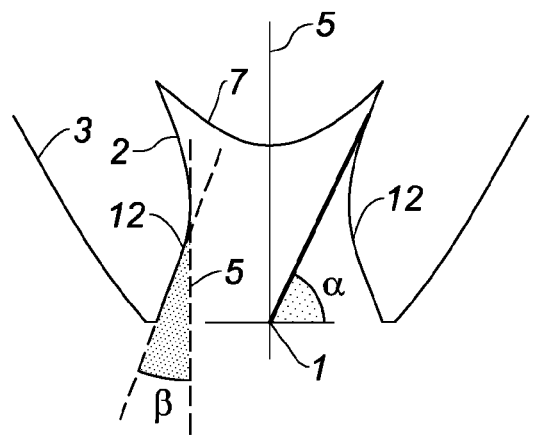
FIG. 5 illustrates an annular area of the collimator illustrated in FIGS. 3 and 4.
Figure 6:
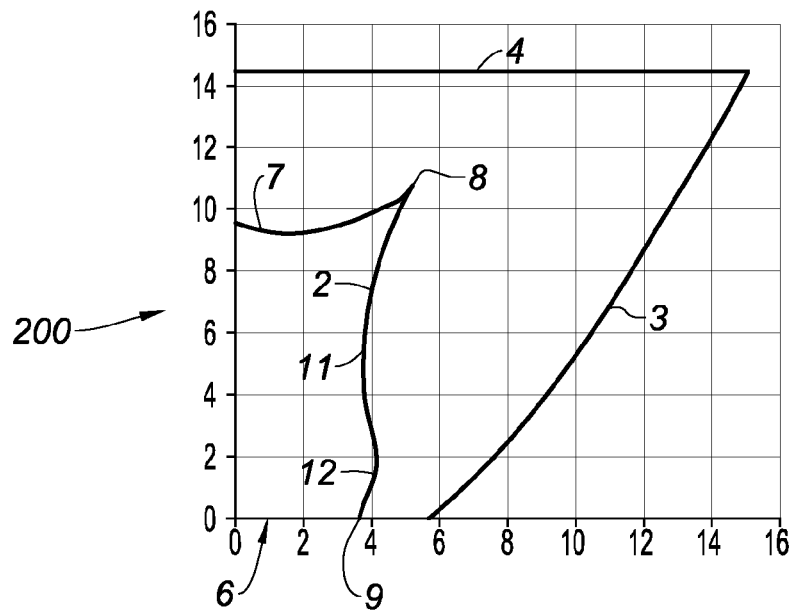
FIG. 6 illustrates a collimator according to a second embodiment of the invention.
Figure 7:
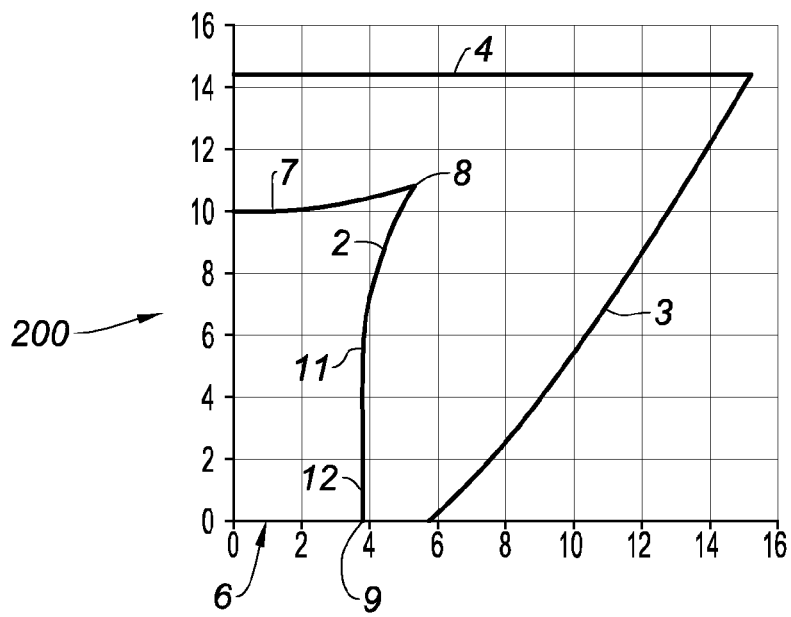
FIG. 7 shows a collimator according to a third embodiment according to the invention.

FIGS. 4, 6 and 7 each illustrate an embodiment which differs from each other by the configuration of the tangent to the base of the inner lateral wall 2. It is inclined by an angle of about 20° with respect to the optical axis 5 in FIG. 4, by an angle close to 0° in FIG. 6 and of 0° in FIG. 7. These different angles allow reaching an optimized light intensity. Indeed, these configurations are selected so that the inner lateral wall 2 comprises an annular area 12 defined from the focus 1 under solid angle α (alpha) ranging from 35° to 90° relative to the optical axis 5 and so that the tangent of the annular area 12 forms an angle β (beta) which may range between 0° and 30° relative to the optical axis 5 (refer to FIG. 5). This annular area 12 then has a low slope relative to the optical axis 5 so that its peripheral end is as close as possible to the light source, which then lights a large area in the vicinity of the surface 4. However, according to the conservation law of the geometric extent, the light beam is the more intense as its section is large. The annular area 12 as defined thus allows improving the light intensity of the collimated beam.

Furthermore, the collimator 200 is one-piece collimator. It is preferably made of a polymer, such as silicone, which confers flexibility to the collimator 200. This allows an easy demolding of the collimator 200 despite the convex portion 11 of the inner lateral wall 2 which forms an undercut. Other flexible materials may be used, such as thermosetting materials remaining flexible at room temperature (Shore-A hardness comprised between 50 and 90) and transparent in the visible range.

According to a non-illustrated variant, the collimator is formed of several assembled members. The used materials are, for example selected from thermoplastics such as polycarbonate, PMMA, cycloolefin copolymer, polystyrene and polyamide.

Thus, the present invention provides a collimator 200 which allows limiting the Fresnel losses, preventing the formation of a ring of stray light, refocusing the beams at the periphery of the light source, increasing the light intensity and using light sources with large dimensions. Furthermore, the collimator 200 formed by silicone is one-piece collimator for a short manufacturing process and simple to be performed.

It goes without saying that the invention is not limited to the embodiment described hereinabove by way of example but that it comprises all technical equivalents and variants of the described means as well as combinations thereof.

The invention claimed is:

1. An optical collimator intended for collimating incident light beams coming from a light source, the optical collimator having a bowl overall shape and having a rotational symmetry about an optical axis of the optical collimator, the optical collimator further having an object focus defining a single point on the optical axis, whereby the incident light beams emitted from the object focus are collimated with respect to the optical axis, the optical collimator comprising:
an output wall,
an input recess opposite to the output wall, the input recess being defined by an inner lateral wall and an inner upper wall intersecting the inner lateral wall at a circular intersection area, the inner lateral wall and the inner upper wall defining an input, respectively peripheral and central, of the incident light beam in the optical collimator, and
a peripheral reflection wall joining the output wall to the inner lateral wall,
the surface of the inner lateral wall being configured such that a straight line (D), which is tangential to the inner lateral wall at the circular intersection area, passes through the object focus of the optical collimator.

2. The optical collimator according to claim 1, wherein the inner lateral wall has a curvilinear surface with rotational symmetry about the optical axis of the optical collimator.

3. The optical collimator according to claim 1, wherein the inner lateral wall comprises a convex portion configured so as to intercept at the same point (A) a central ray (i) coming from the object focus and a virtual marginal ray extending an effective marginal ray (e) coming from the periphery of the light source, the effective marginal ray (e) being intercepted at a point (B) of the inner lateral wall,
and so that the peripheral reflection wall reflects the central ray (i) at a point (A') and the effective marginal ray (e) at a point (B') with the point (A) distinct from the point (B) and the point (A') having a distance relative to the object focus greater than that of the point (B').

4. The optical collimator according to claim 1, wherein the inner lateral wall comprises an annular area defined from the object focus under a solid angle ($\alpha$) comprised between 35° and 90° relative to the optical axis;
and in which the tangent of the annular area forms an angle ($\beta$) comprised between 0° and 30° relative to the optical axis.

5. The optical collimator according to claim 1, wherein the optical collimator is one-piece collimator.

6. The optical collimator according to claim 1, the optical collimator is made of polymer.

7. The optical collimator according to claim 6, wherein the polymer is selected from a silicone, a polyurethane resin or any other transparent material in the visible range, flexible at room temperature, and thermosetting.

8. The optical collimator according to claim 6, wherein the polymer has a shore-A hardness lower than 90.

9. The optical collimator according to claim 1, wherein the inner upper wall comprises a portion having a convex surface so as to converge the light rays coming from the object focus.

10. The optical collimator according to claim 1, wherein the output wall comprises a portion having a substantially flat surface.

11. The optical collimator according to claim 1, wherein the output wall comprises a portion having a substantially concave surface.

12. The optical collimator according to claim 1, wherein the output wall is divided into a central area and a peripheral area, the surface of the central area being configured to share the refraction of the incident light rays with the inner upper wall and the surface of the peripheral area being configured to operate in association with the peripheral reflection wall.

13. The optical collimator according to claim 1, wherein the output wall comprises a micro-texturing configured to generate one light beam type from the light source.

14. The optical collimator according to claim 1, wherein the output wall comprises a micro-texturing configured to generate an intermediate beam, a wide beam or elliptical beam, from the light source.

* * * * *